United States Patent [19]

Hegyi

[11] Patent Number: 5,264,691
[45] Date of Patent: Nov. 23, 1993

[54] SYSTEM FOR DETERMINING THE DIRECTION OF INCIDENT OPTICAL RADIATION

[76] Inventor: Dennis J. Hegyi, 1708 Morton Ave., Ann Arbor, Mich. 48104

[21] Appl. No.: 724,869

[22] Filed: Jul. 26, 1991

[51] Int. Cl.$^5$ .............................................. G01J 1/20
[52] U.S. Cl. .............................. 250/203.4; 250/206.2
[58] Field of Search ............... 250/203.1, 203.3, 203.4, 250/206.1, 206.2; 126/425; 356/141, 152

[56] References Cited

U.S. PATENT DOCUMENTS

| | | | |
|---|---|---|---|
| 3,268,185 | 8/1966 | Eckermann | 250/203.4 |
| 3,996,460 | 12/1976 | Smith | 250/203.4 |
| 4,018,532 | 4/1977 | Fletcher et al. | 250/203.4 |
| 4,082,947 | 4/1978 | Haywood et al. | 250/203.4 |
| 4,242,580 | 12/1980 | Kaplow et al. | 126/425 |
| 4,287,411 | 9/1981 | Beucci | 250/203.4 |
| 4,297,572 | 10/1981 | Carlton | 250/203.4 |
| 4,355,895 | 10/1982 | Laue | 250/203.4 |
| 4,404,465 | 9/1983 | Miller | 250/203.4 |
| 4,424,801 | 1/1984 | Mori | 126/425 |
| 4,611,914 | 9/1986 | Homma | 250/203.4 |
| 5,117,744 | 6/1992 | Zimmer et al. | 250/203.4 |

Primary Examiner—David C. Nelms
Attorney, Agent, or Firm—Rohm & Monsanto

[57] ABSTRACT

A photosensor arrangement produces an electrical signal responsive to the position of a source of light by employing a mask situated at a predetermined height above a plurality of photodetectors, such that as the sun moves with respect to the apparatus, a shadow is cast which is responsive to the location of the sun. An apparatus constructed in accordance with the invention has a plurality of photosensors, each having a respective substantially planar light-sensitive surface for receiving the input light from the sun over a predetermined range of positions. In a preferred embodiment where compactness is desired, the planar light-sensitive surfaces are arranged in a substantially coplanar relationship with respect to one another. The light mask, which has opaque and transparent portions, is arranged to overlie the substantially planar light-sensitive surfaces for determining the position-responsive sensitivity characteristic of the apparatus. In certain embodiments, a diffuser is interposed between the light mask and the photodetectors. The response characteristic of the apparatus can be determined by geometric analysis, or empirically using values which may be stored in a look-up table.

16 Claims, 6 Drawing Sheets

SYSTEM FOR DETERMINING THE DIRECTION OF INCIDENT OPTICAL RADIATION

BACKGROUND OF THE INVENTION

This invention relates generally to systems for determining the position of a source of radiation, and more particularly, to a system which employs a plurality of photodetectors for producing an electrical output signal which is responsive to the position of a source of light, with respect to the photodetectors.

Of the numerous known systems for producing electrical signals having information content responsive to the relative orientation of a light source, most are complex and expensive, and have associated therewith electronic signal analysis systems which are bulky, thereby limiting their applicability in space-restricted environments, such as the interior of motor vehicles.

One known arrangement for determining the position of a source of incident radiation utilizes a pair of solar cells arranged in orthogonal relationship to one another. Thus, this system cannot be employed in applications requiring flatness or compactness of the sensor arrangement. The incident electromagnetic radiation, or sunlight, causes the orthogonally arranged radiation detectors to generate respective output electrical signals having amplitudes responsive to the angle of incidence of the light. Ratio-detecting circuitry is used to determine the angle of incidence with respect to the orientation of the solar detectors, by monitoring and comparing the output signals of the respective solar detectors.

A further known system for determining the direction of incident radiation utilizes a sensor head having a hemispherical convex surface area on which are terminated a plurality of optical fibers. The optical fibers are bundled and terminated at their distal ends with detectors, which are arrayed illustratively in the form of a matrix. This known system, however, in addition to requiring a multiplicity of detectors arranged in a matrix, also requires complex mathematical and evaluation circuitry which render this known system unsuitable in applications where simplicity and economy are required.

In vehicles which continually are changing their orientation with respect to the sun, it is desirable to modify the output of associated heating and cooling systems so as to take into consideration the effects of sunlight. In such systems, however, there is not often available space for a complex, multi-component sensor and its associated computation circuitry. There is therefore a need for a sensor which is responsive to the position of a light source, and which also is compact and reliable.

It is, therefore, an object of this invention to provide a system for determining the position of a source of incident radiation which is simple and inexpensive, and does not require a mechanical system to track the source. It is another object of this invention to provide a system for monitoring the position of a light source wherein the detectors can be arranged to be coplanar with one another to achieve compactness and simplicity of manufacture.

It is also an object of this invention to provide a system for monitoring the position of a light source which has substantially flat, coplanar light inputs to the sensors, and wherein a simple current ratio determination can be used to indicate the location of the source.

It is a further object of this invention to provide a system for monitoring the position of a light source wherein an output electrical signal is responsive to an angle of elevation of the light source with respect to a predetermined horizon.

It is additionally an object of this invention to provide a system for monitoring the position of a light source wherein an output electrical signal is responsive to a predetermined azimuth angle.

It is yet a further object of this invention to provide a system for monitoring the position of a light source wherein fiber optic elements are not needed for directing the light to be monitored to a detector.

It is also another object of this invention to provide a system for monitoring the position of a light source wherein a high degree of compactness is achieved.

It is yet an additional object of this invention to provide a system for monitoring the position of a light source, the system being particularly suited for mobile applications.

It is still another object of this invention to provide a system for determining the position and intensity of a source of incident radiation which is simple and inexpensive, and does not require a feedback arrangement.

It is yet a further object of this invention to provide a system for determining the position and intensity of the sun, which does not require a plurality of light-receiving surfaces at different orientations.

It is also a further object of this invention to provide an arrangement for controlling a mobile cooling system in response to the angle of incidence of sunlight.

It is yet an additional object of this invention to provide an arrangement for controlling a mobile cooling system in response to incident sunlight being within a predetermined range of angles of azimuth.

SUMMARY OF THE INVENTION

The foregoing and other objects are achieved by this invention which provides a photosensor arrangement for producing an electrical signal which is responsive to the position of a source of light with respect to the photosensor arrangement. In accordance with the invention, each of a plurality of sensors has a respective substantially planar light-sensitive surface which receives input light from the source of light, while the source is within a predetermined range of positions with respect to the substantially planar light inputs. All of the substantially planar light-sensitive surfaces are arranged in a substantially co-planar relationship with respect to one another. Additionally, each of the sensors has a respective output terminal for providing an output electrical signal which is responsive to the input light from the source of light. The arrangement of the present invention is further provided with a light mask which is arranged to overlie the substantially planar light-sensitive surfaces of the plurality of sensor means for determining a position-responsive sensitivity characteristic of the photosensor arrangement. In this manner, the output electrical signals, in combination, are responsive to the position of the source of light.

In one embodiment of the invention, the light mask is arranged to overlie the substantially planar light-sensitive surfaces at a predetermined height h thereover. In certain other embodiments, there is provided a diffuser interposed between the substantially planar light-sensitive surfaces and the light mask, for diffusing light incident thereto. The diffuser is arranged to overlie the substantially planar light-sensitive surfaces at a predetermined height d thereover, and in such an embodiment, the light mask is arranged to overlie the diffuser at the predetermined height h thereover.

In some of the embodiments of the invention wherein there is provided the diffuser interposed between the substantially planar light-sensitive surfaces and the light mask, there is further provided data storage means for storing data responsive to a reflectivity characteristic of the diffuser, or the reflectivity characteristics of the detector in embodiments without a diffuser. As will be discussed in detail hereinbelow, one would expect a diffuser to yield photodetector currents which are proportional to the area projection factor cos $\alpha$, and for which the significance of the variation of the reflectivity with angle of incidence is less important. The reflectivity of the diffuser or light-sensitive surface can be calculated to reasonable accuracy without difficulty. Alternatively, the reflectivity can easily be measured and the results stored as a look-up table in a storage device.

In accordance with the invention, the mask has a first portion which prevents transmission of light, and a second portion which permits transmission of light to the light-sensitive surfaces of the sensors. This mask, therefore, since it is arranged at a distance above the light-sensitive surfaces, casts a shadow on the light-sensitive surfaces which is responsive to the position of light source. Since the output electrical signal of each respective output terminal is responsive to the proportion of the area of its associated light-sensitive surface which is illuminated, the electrical signals can be employed to provide an indication of the direction from which incident light is received.

In accordance with a further aspect of the invention, there are provided first and second light-responsive elements, each having an optical input having a predetermined light-sensitive surface area for producing at an output thereof a respective electrical signal. The output electrical signals are responsive to the proportion of the predetermined light-sensitive surface areas which are illuminated by the source of optical radiation. A mask, as previously mentioned, is arranged to overlie the optical inputs of the light-responsive elements for casting a shadow disproportionately on the optical inputs in response to the location of the source of optical radiation. The disproportionate illumination thereby results in correspondingly disproportionate respective electrical signals, which disproportionality can be correlated to the position of the source of optical radiation.

In one embodiment of this further aspect of the invention, the mask is arranged to overlie the light-sensitive surface area at a predetermined height h thereover, as previously described. Additionally, the light-sensitive surface areas of the first and second light responsive elements each have a substantially square configuration of length l, along each side, whereby the source of optical radiation has a position with respect to the system defined by a solar zenith angle, $\theta$ and azimuthal angle, $\phi$, in the plane of the light-sensitive surface areas. The specific mathematical relationship will be discussed in detail hereinbelow.

In a preferred embodiment, the transparent portion of the mask is arranged to be substantially in registration with the predetermined light-sensitive surface areas of the light-responsive elements. Moreover, the transparent portion can be dimensioned to correspond substantially with the predetermined light-sensitive surface areas.

In accordance with a heating and cooling system control aspect of the invention, a control element for a vehicle for producing a control signal responsive to the direction of incidence of sunlight is provided with first and second photodetectors, each having an input for receiving the sunlight and an output terminal for providing an output electrical signal responsive to the sunlight. The inputs have a generally planar configuration and additionally are arranged to be substantially coplanar with respect to each other. There is further provided in this aspect of the invention a light mask for controlling the incidence of the sunlight upon the input of the first photodetector in response to the direction of incidence of the sunlight.

BRIEF DESCRIPTION OF THE DRAWING

Comprehension of the invention is facilitated by reading the following detailed description, in conjunction with the annexed drawing, in which.

DETAILED DESCRIPTION

The specific illustrative embodiment of the present invention described herein can be used to determine three quantities which characterize the position of the sun and the solar flux. The angular position of the sun can be characterized using two angular coordinates, illustrative the zenith angle of the sun, $\theta$, and the azimuth angle of the sun, $\phi$. The value of $\theta$ represents the angle between the zenith which is perpendicular to the ground and a line which points to the center of the sun. The third variable which characterizes the solar radiation is the solar flux, I, which is incident upon the sensors, as will be described herein.

In accordance with the invention, a planar photodetector with two or more elements, all of which are located in a plane, and an aperture mask located a known small distance above the photodetectors, comprise the primary components of the system. In operation, the sun casts a sharp shadow of the mask on the photodetectors. Motion of the sun relative to the system, which may result from the sun's motion across the sky or because of the motion of the device itself, in situations where it is mounted on a vehicle (not shown), causes the shadow of the mask to move across the photodetectors. Consequently, the relative area of sunlight and shadow falling on each photodetector element will be a function of the position of the sun relative to the system, and accordingly, the photocurrent coming from each detector element will be a function of the position of the sun. The position of the sun can be determined by taking ratios of the photocurrents between different detector elements, while the intensity of the solar flux can be determined from the actual photocurrents, the solar position, and the light-to-current conversion efficiency of the photodetectors.

It is to be understood that the geometry of the aperture mask and the photodetectors will have a substantial bearing on the complexity of the calculations which are used to determine the solar angles from measurements of the ratios of detector element currents. However, such calculations can be avoided by relating the ratios of detector currents to solar angles empirically, by performing an initial calibration of the device. It will be evident from the foregoing that the empirical approach is straight forward, although it may be tedious depending upon the desired degree of accuracy. Accordingly, the present discussion will focus on calculating the response for a particular simple illustrative geometry which would make a useful production sensor.

Figure 1:
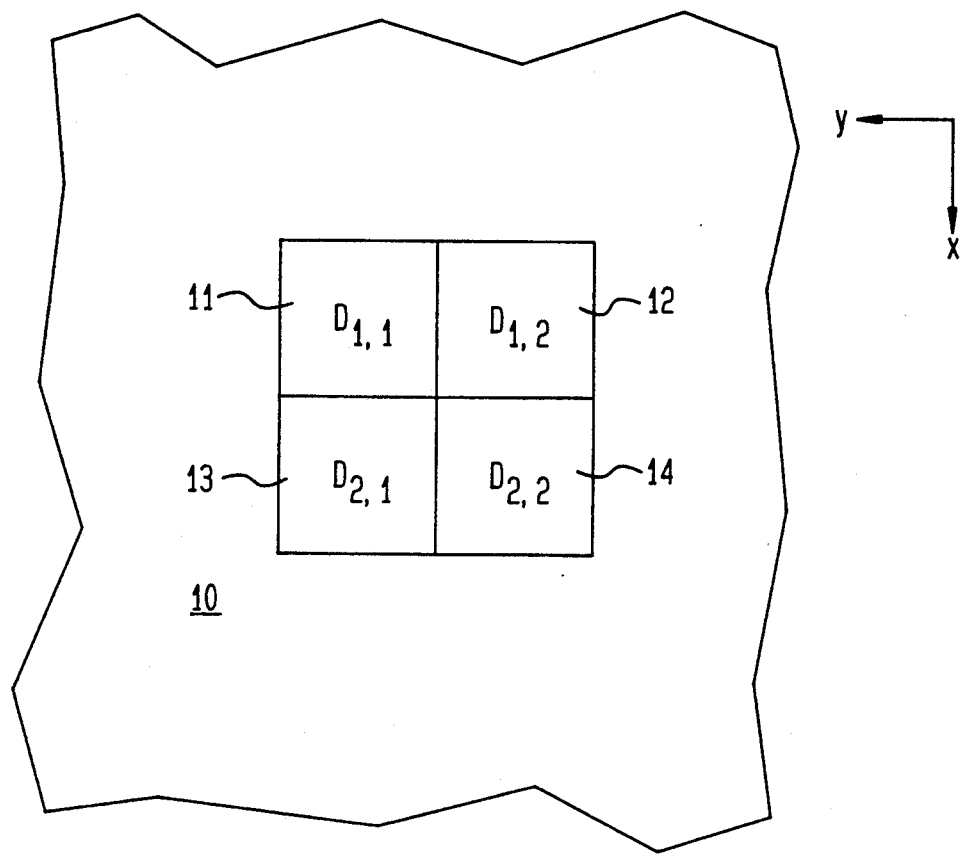
FIG. 1 is a simplified schematic representation of a four-element photodetector system showing the relationship between the light-sensitive surfaces and the light mask.
Figure 1:
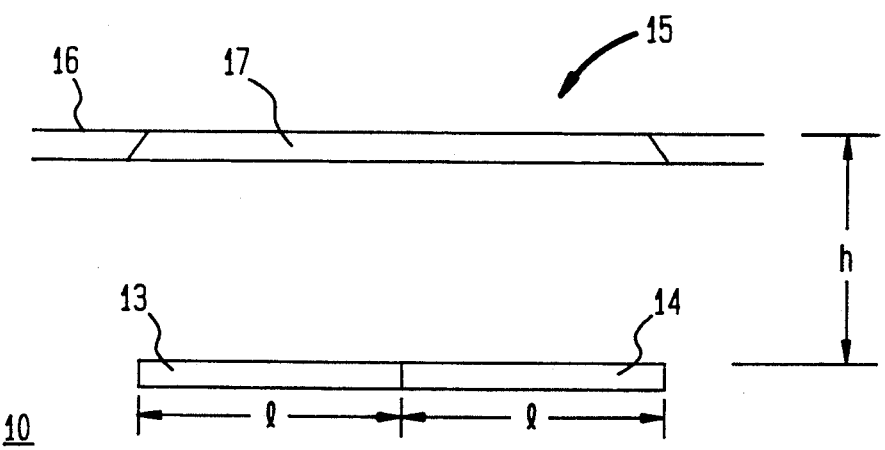

FIG. 1 shows plan and side elevations of a simplified structure which is useful for illustrating the principles of operation of the present invention. An array of photodetector 10 is provided with four photodetector elements 11, 12, 13, and 14. As can be seen from the side view in FIG. 1, the photodetector elements are disposed adjacent to one another, and each photodetector element has a square configuration with a side length of l. A mask element 15 is shown to be arranged at a height h above the plane of the photodetector elements. Although not readily apparent from this figure, mask element 15 has an opaque portion 16 and a transparent portion 17. The transparent portion has a square configuration which, in this embodiment, has sides of length 2l.

The ratios of the photocurrents of the photodetector elements is directly related to the ratio of the areas of the photodetector elements which are illuminated by sunlight. Thus, the ratio of photocurrents can be calculated in direct correspondence to the ratio of areas of the photodetector elements which are illuminated by sunlight. in the practice of the invention, the square regions which illustrate the photodetector currents correspond to the light-sensitive surfaces of the photodetector elements. Thus, each such light-sensitive surface has an area $l^2$. In addition, photodetector elements 11 through 14 have respective designation $D_{1,1}$, $D_{1,2}$, $D_{2,1}$, and $D_{2,2}$.

Figure 2:
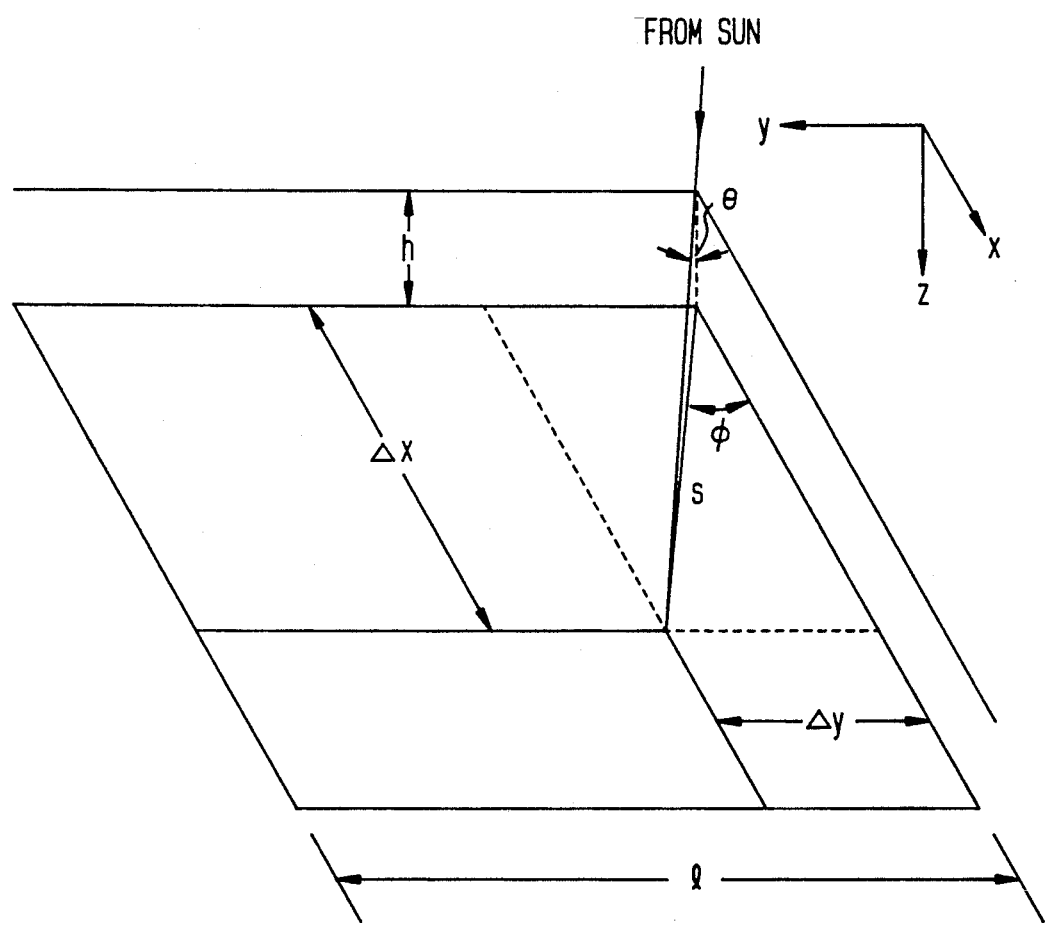
FIG. 2 is a three-dimensional schematic representation of the arrangement of FIG. 1 which is useful in analyzing the operation of the system of the invention geometrically.

To calculate the area of each photodetector illuminated by sunlight, the analysis describes a ray coming from the center of the sun. For sake of simplicity, the sun is considered to be a point source. Employing the coordinate system of FIG. 2, where $\theta$ is the solar zenith angle measured with respect to the z axis, and $\phi$ is the azimuthal angle measured from the x axis toward the y axis. The area, $A_{ij}$ of the photodetector element $D_{ij}$ illuminated by the sun, as indicated in FIG. 2 for element $D_{1,2}$, is:

$$A_{1,1} = (l - \Delta x)l,$$

$$A_{1,2} = (l - \Delta x)(l - \Delta y),$$

$$A_{2,1} = l^2,$$

$$A_{2,2} = l(l - \Delta y),$$

where $s/h = \tan\theta$, $\Delta x = s\cos\phi = h\tan\theta\cos\phi$, and $\Delta y = h\tan\theta\sin\phi$.

In the four detector embodiment discussed herein, $$R_1 \equiv \frac{A_{1,2}}{A_{1,1}} = \frac{A_{2,2}}{A_{2,1}} = 1 - (h/l)\tan\theta\sin\phi$$

and $$R_2 \equiv \frac{A_{1,2}}{A_{2,2}} = \frac{A_{1,1}}{A_{2,1}} = 1 - (h/l)\tan\theta\cos\phi.$$

However, in a three detector embodiment (not shown), $$R_1 \equiv \frac{A_{1,2}}{A_{1,1}} = 1 - (h/l)\tan\theta\sin\phi$$

and $$R_1 \equiv \frac{A_{1,1}}{A_{2,1}} = 1 - (h/l)\tan\theta\cos\phi.$$

From these equations, it is possible to solve for $\phi$ and $\theta$ in terms of the photodetector signals. The solutions are:

$$\phi = \arctan\frac{1 - R_1}{1 - R_2},$$

and $$\theta = \arctan\frac{1 - R_1}{(h/l)\sin\phi},$$

or $$\theta = \arctan\frac{1 - R_2}{(h/l)\cos\phi}.$$

Assume that it is desired to use the foregoing approach to design a detector capable of detecting the sun for $\theta \leq 80°$, or to within 10° of the horizon. One of the compromises of the present approach is that one cannot obtain good results in attempting to detect the sun on the horizon, i.e., at $\theta = 90°$. For any practical detector, however, this is rarely an issue because very little energy is received from the sun at such a large angle. To detect the sun for $\theta \leq 80°$, one can determine the ratio of h/l. This can be seen to be $h/l = \arctan 10° = 0.176$. The ratio of h/l is therefore the only quantity that needs to be specified.

Figure 3:
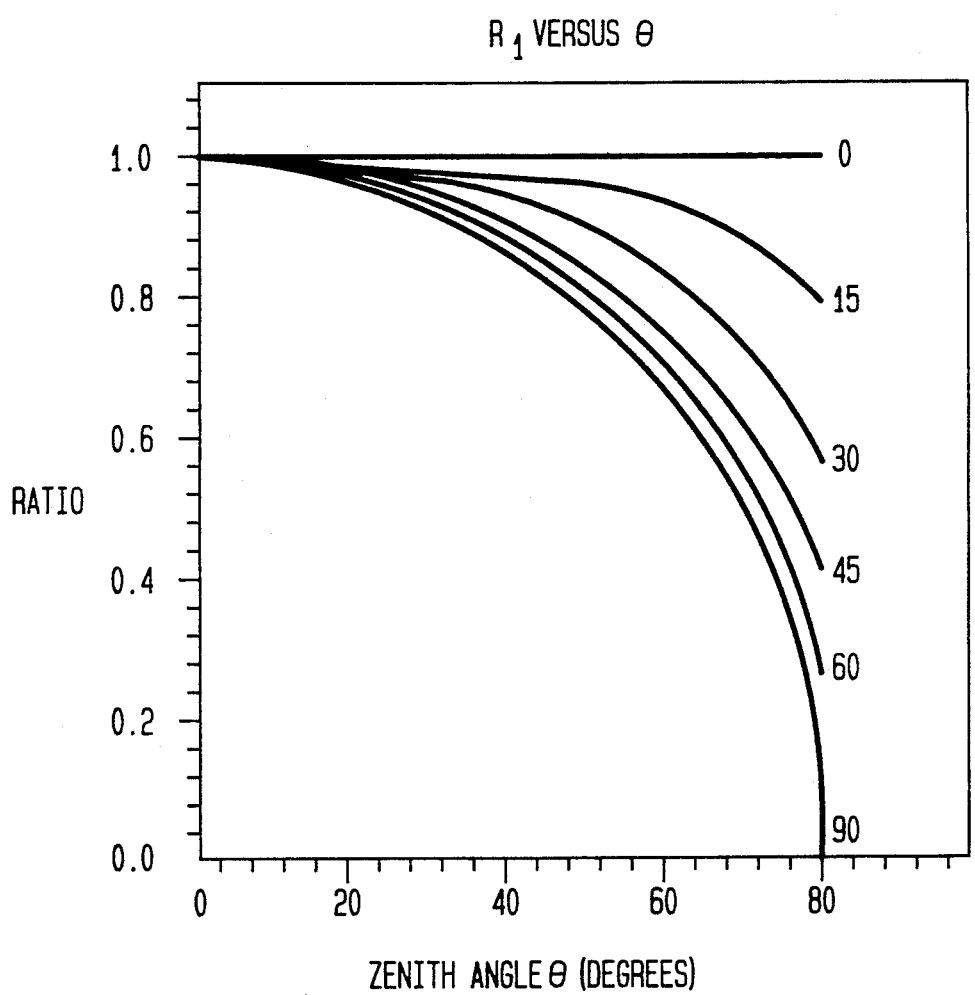
FIG. 3 is a graphical representation of the mathematical relationship between the ratio $R_1$ versus $\theta$.
Figure 4:
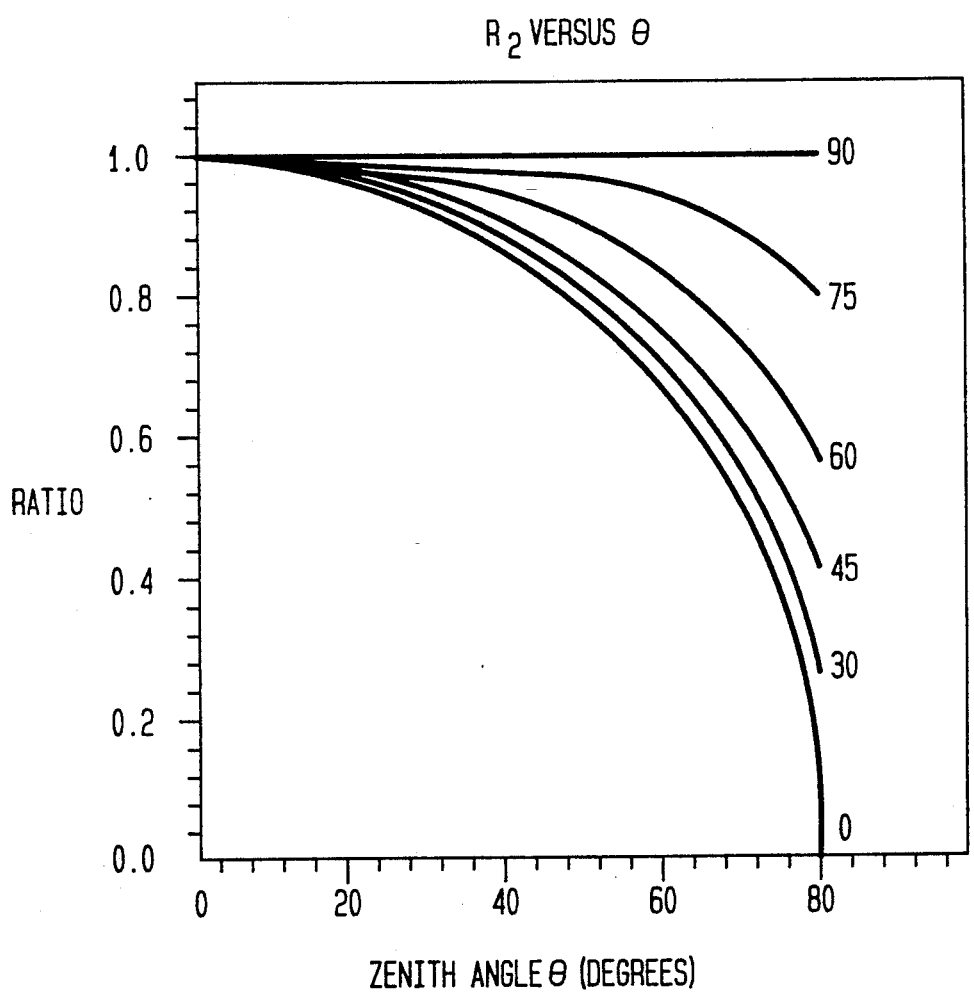
FIG. 4 is a graphical representation of the mathematical relationship between the ration $R_2$ versus $\theta$.

Numerical evaluation of the above equations permits one to calculate how $R_1$ and $R_2$ change as $\theta$ and $\phi$ change. FIGS. 3 and 4 are graphical representations which illustrate the relationship as a function of $\theta$, for several values of $\phi$. In addition, the values of $\phi$ and $\theta$ have been calculated for a grid of values $R_1$ and $R_2$ in the following TABLE. Interpolation can be applied to determine intermediate values of $R_1$ and $R_2$ between the grid values. Thus, it can be seen from the TABLE and the graphs of FIGS. 3 and 4 that each pair of values of $R_1$ and $R_2$ lead to unique values of $\theta$ and $\phi$.

TABLE $R_1$ and $R_2$ for $\theta$ and $\phi$

| $R_1$ | | 1.00 | 0.96 | 0.92 | 0.88 | 0.84 | 0.80 | 0.76 | 0.72 | 0.68 | 0.64 | 0.60 | 0.56 | 0.52 | 0.48 | 0.44 | 0.40 | 0.36 | 0.32 | 0.28 | 0.24 | 0.20 | 0.16 | 0.12 | 0.08 | 0.04 | 0.00 |
|---|---|---|---|---|---|---|---|---|---|---|---|---|---|---|---|---|---|---|---|---|---|---|---|---|---|---|---|
| 1.00 | $\theta$ | 0.0 | 12.8 | 24.4 | 34.3 | 42.3 | 48.7 | 53.7 | 57.8 | 61.2 | 63.9 | 66.3 | 68.2 | 69.9 | 71.3 | 72.6 | 73.7 | 74.6 | 75.5 | 76.3 | 77.0 | 77.6 | 78.2 | 78.7 | 79.2 | 79.6 | 80.0 |
|  | $\phi$ | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 0.96 | $\theta$ | 0.0 | 17.8 | 26.9 | 35.7 | 43.1 | 49.2 | 54.1 | 58.1 | 61.4 | 64.1 | 66.4 | 68.3 | 69.9 | 71.4 | 72.6 | 73.7 | 74.7 | 75.5 | 76.3 | 77.0 | 77.6 | 78.2 | 78.7 | 79.2 | 79.6 | 80.0 |
|  | $\phi$ | 0.0 | 0.0 | 2.3 | 2.4 | 2.5 | 2.6 | 2.7 | 2.9 | 3.0 | 3.2 | 3.4 | 3.6 | 3.8 | 4.1 | 4.4 | 4.8 | 5.2 | 5.7 | 6.3 | 7.1 | 8.1 | 9.5 | 11.3 | 13.5 | 15.6 | 17.7 |
| 0.92 | $\theta$ | 0.0 | 45.0 | 32.7 | 39.3 | 45.5 | 50.7 | 55.2 | 58.9 | 61.9 | 64.5 | 66.7 | 68.5 | 70.1 | 71.5 | 72.7 | 73.8 | 74.7 | 75.6 | 76.3 | 77.0 | 77.6 | 78.2 | 78.7 | 79.2 | 79.6 | 80.0 |
|  | $\phi$ | 0.0 | 2.9 | 4.5 | 5.2 | 5.4 | 5.0 | 4.8 | 4.6 | 4.4 | 4.1 | 3.8 | 3.4 | 3.0 | 2.6 | 2.1 | 1.6 | 1.2 | 0.8 | 0.6 | 0.4 | 0.3 | 0.2 | 0.1 | 0.0 | 0.0 | 0.0 |

(Full numerical table spanning rows $R_1$ = 1.00, 0.96, 0.92, 0.88, 0.84, 0.80, 0.76, 0.72, 0.68, 0.64, 0.60, 0.56, 0.52, 0.48, 0.44, 0.40, 0.36, 0.32, 0.28, 0.24, 0.20, 0.16, 0.12, 0.08, 0.04, 0.00; each with $\theta$ and $\phi$ values across $R_2$ columns from 1.00 to 0.00 in steps of 0.04.)

The additional parameter which is essential to a complete description of the solar radiation is the solar flux. It is understood that, given the conversion efficiency between photodetector current and incident flux striking the detector perpendicular to the plane of the detector, a measured photodetector current can be used to obtain the solar flux at perpendicular incidence. However, at angles of incidence other than perpendicular to the detector, determination of the flux of the sun is more complicated. In such non-perpendicular arrangements, the angle at which the solar flux strikes the detector must be considered. The angle between the perpendicular to the detector surface and the direction of the solar radiation is the same angle $\theta$ which was discussed hereinabove. Initially, one might expect that the measured solar flux is reduced by the projection factor of the area of the photodetector as seen from the position of the sun. This would lead to the photodetector current being reduced by a factor $\cos \theta$ relative to solar radiation at an angle of incidence of $\theta =$ zero. However, the reflectivity of the photodetector surface is also a function of $\theta$ and must be taken into consideration, particularly for silicon detectors, since the reflectivity is not small and is a function of $\theta$. An alternative to calculating the reflectivity as a function of $\theta$ is to perform a simple calibration. By tipping the photodetector relative to the direction of incident sunlight to cover the range of angles of incidence of interest and measuring the photodetector current, a calibration which takes into consideration all of the appropriate factors can easily be accomplished.

Figure 5:
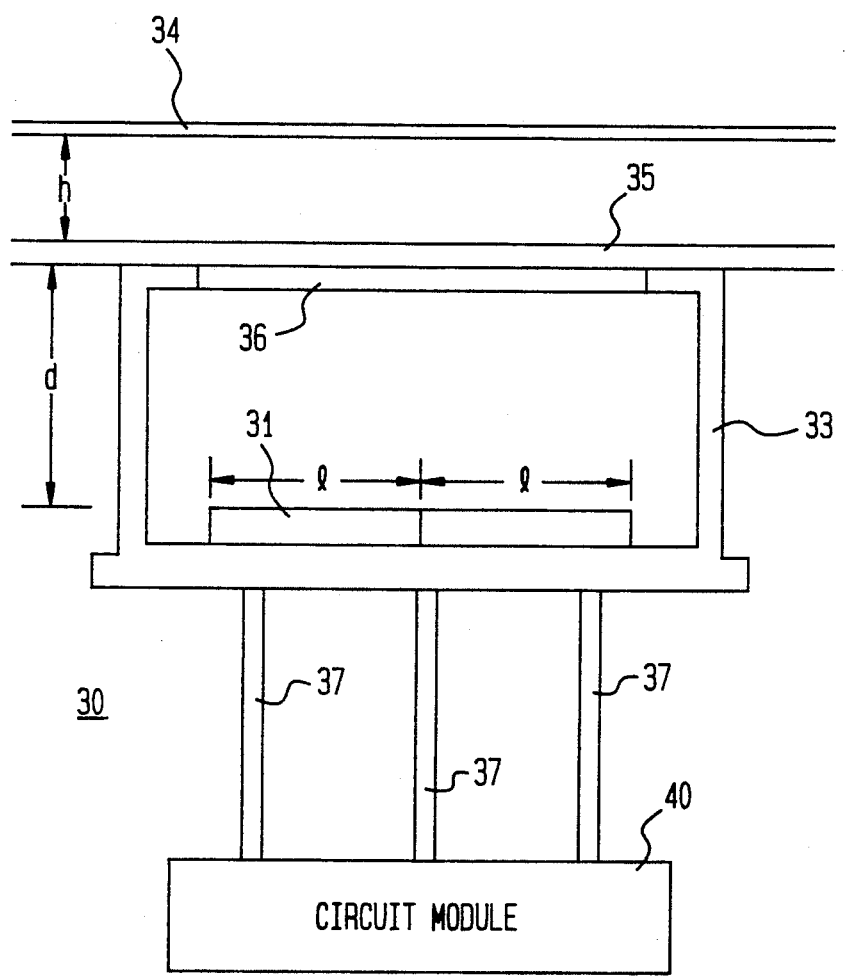
FIG. 5 is a cross-sectional side view of a specific embodiment of the invention which employs a diffuser interposed between the light mask and the substantially planar light-sensitive surfaces.

FIG. 5 is a simplified schematic representation of a detector system 30 which employs the mathematical approach described hereinabove to achieve a highly practical embodiment of the invention. A quadrant photodetector photodiode 31 is hermetically sealed in a metal can 33. Such a seal will render the device useful at temperatures above 100° C. Each element of silicon quadrant photodiode 31 is, in this specific embodiment, square in configuration and has a side length of l. In this embodiment, a square light mask 34, which has a length on each side of approximately 2l, is similar to that described hereinabove with respect to FIG. 1, and is arranged a distance h above a light diffuser 35. The light diffuser is mounted above a window 36 of metal can 33 so as to be a distance d above silicon quadrant photodiode 31. The electrical signals produced by the elements of the silicon quadrant photodiode are available at terminals 37 which extend through the metal can 33 in a conventional manner. These terminals would then be coupled to a circuit module 40, which is shown in the figure as a generalized function block representation for a plurality of electrical and electronic components (not shown), including the look-up table (not shown) mentioned herein which holds data corresponding to the reflectivity values.

An understanding of the operation of detector system 30 is enhanced by reference to a hypothetical simplified two-element detector system (not shown). The angle $\alpha$ describes the direction between a line perpendicular to the surface of the diffuser and the direction of incidence sunlight. The variable R represents the ratio of photodetector currents. Since, in this hypothetical embodiment there are only two photodetector elements, there is only one ratio to be determined.

Figure 6:
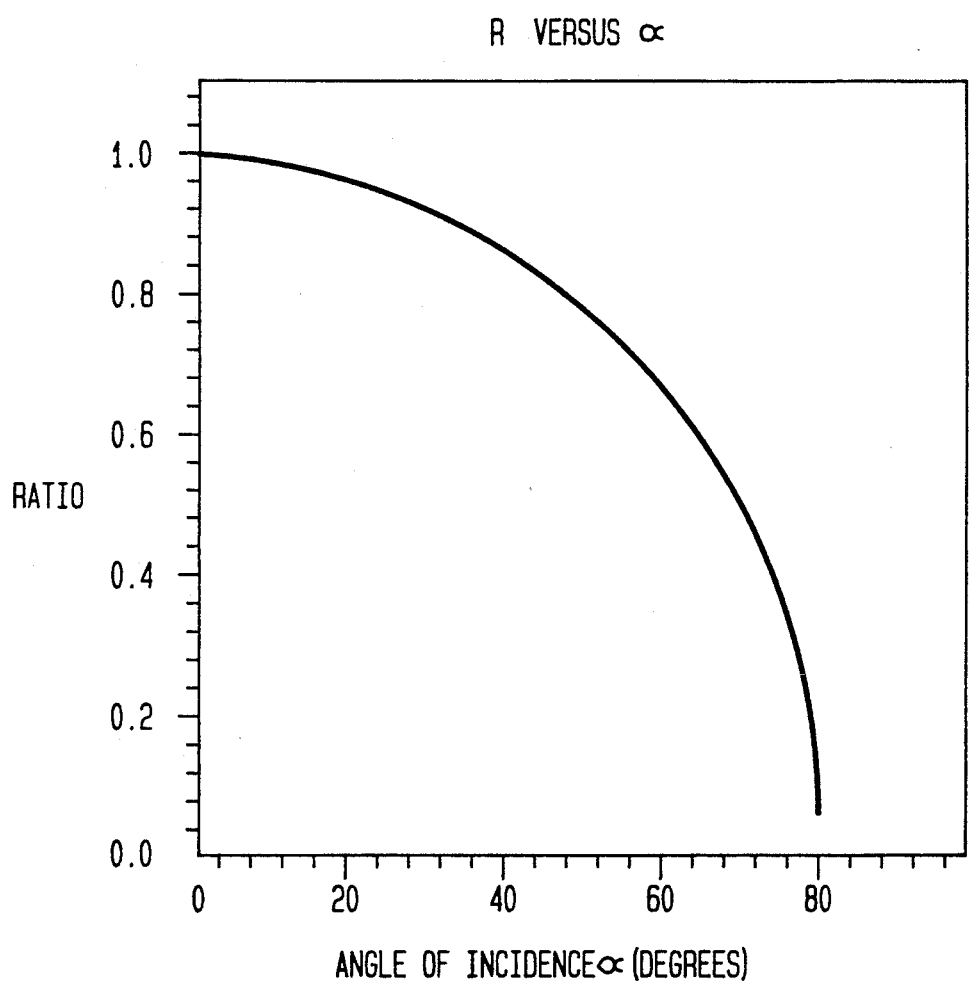
FIG. 6 is a graphical representation of the relationship between the ratio R of the photodetector currents versus $\alpha$.

FIG. 6 is a graphical plot of the value of the ratio R versus the angle $\alpha$, in degrees. As shown, R is plotted versus $\alpha$ for the same ratio h/l used in the analysis presented hereinabove, i.e., h/l=0.176, and for h=d. For comparison purposes, the ratio R may be compared to the special cases of $\phi = 90°$ for the $R_1$ versus $\theta$ plot shown in FIG. 3, or the $\phi = 0°$ for the $R_2$ versus $\theta$ plot of FIG. 4. For these cases, the quad detector arrangement reduces to a two-element detector. As may be seen by reference to these special cases, the addition of a diffuser as an intermediate element does not qualitatively change the response function of the device. Results similar to those set forth hereinabove would be obtained if one used a quadrant detector with the intermediate diffuser, as described.

It is still necessary to consider how to recover the value of the solar flux with the system of FIG. 5. One might expect the diffuser approach to yield photodetector currents which are proportional to the area projection factor $\cos \alpha$, and for which the significance of the variation of the reflectivity with angle of incidence is less important. The reason for this, as previously noted, is that a typical diffuser has an index of refraction of about 1.5, while a detector made from silicon has an index of refraction which may exceed 4, depending upon the wavelength of the incidence light. Therefore, the reflectivity of the diffuser device is smaller and can be calculated to reasonable accuracy without difficulty. Of course, it can easily be measured and the result stored in a memorialized look-up table, in the same way as for the device without the diffuser.

It is to be understood that, in other embodiments of the invention, the detector could have other configurations, such as circular configurations, or any shape. In addition, the detector elements need not be located in a single plane, although such a coplanar orientation will provide a measure of compactness. In addition, the light mask need not be the same size as the elements in the photodetector array, and need not even have the same shape. However, some performance advantages are achieved by configuring the transparent portion of the mask to be the same size as the light-sensitive surfaces of the array of photodetectors.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not construed to limit the scope thereof.

What is claimed is:

1. A photosensor arrangement for producing an electrical signal responsive to the position of a source of light with respect to the photosensor arrangement, the photosensor arrangement comprising:

a plurality of sensor means, each having a respective substantially planar light-sensitive surface for receiving an input light from the source of light over a predetermined range of positions of the source of light, said substantially planar light-sensitive surfaces being arranged adjacent to one another in a substantially coplanar relationship with respect to one another, each of said sensor means further having a respective output terminal for providing an output electrical signal responsive to said input light; and light mask means arranged to overlie said substantially planar light-sensitive surfaces of said plurality of sensor means for determining a position-responsive sensitivity characteristic of the photosensor arrangement, whereby said output electrical signal is responsive to the position of the source of light, said light mask means being provided with a portion for modulating light from the source of light, said portion corresponding substantially in dimension and in configuration at least to a dimension and to a configuration of said plurality of sensor means.

2. The photosensor arrangement of claim 1 wherein said light mask means is arranged to overlie said substantially planar light-sensitive surfaces at a predetermined height h thereover.

3. The photosensor arrangement of claim 1 wherein there is further provided diffuser means interposed between said substantially planar light-sensitive surfaces and said light mask means, for diffusing light incident thereto, said diffuser means being arranged to overlie said substantially planar light-sensitive surfaces at a predetermined height d thereover and said light mask means is arranged to overlie said diffuser means at a predetermined height h thereover.

4. The photosensor arrangement of claim 3 wherein there is further provided data storage means for storing data responsive to a reflectivity characteristic of said diffuser means.

5. The photosensor arrangement of claim 1 wherein said mask means comprises a first portion for preventing transmission of said light from the source of light, and a second portion for permitting transmission of said light from the source of light to said light-sensitive surfaces of said sensor means.

6. The photosensor arrangement of claim 5 wherein said first portion of said mask means is arranged to cast a shadow on said light-sensitive surfaces of said sensor means in response to the position of the light source.

7. The photosensor arrangement of claim 6 wherein said output electrical signal at each respective output terminal of said plurality of sensor means is responsive to a proportion of illuminated area with respect to shadow area of an associated light-sensitive surface of a sensor means.

8. A system for determining the location of a source of optical radiation, the system comprising:
   first and second light-responsive elements, each having an optical input having a substantially planar light-sensitive surface area for producing at an output thereof a respective electrical signal responsive to a proportion of said substantially planar light-sensitive surface area which is illuminated by the source of optical radiation, said light-sensitive surface areas of said first and second light-responsive elements being arranged adjacent to one another; and
   mask means arranged to overlie said optical inputs of said light-responsive elements, for casting a shadow disproportionately on said optical inputs in response to the location of the source of optical radiation, said disproportionate illumination resulting in correspondingly disproportionate respective electrical signals, said mask means being provided with a portion for modulating the optical radiation from the source of the optical radiation, said portion corresponding substantially in dimension and configuration at least to a dimension and to a configuration of said first and second light-responsive elements.

9. The system of claim 8 wherein said mask means is arranged to overlie said optical inputs at a predetermined height h thereover.

10. The system of claim 9 wherein there is further provided a third light responsive element, said mask means having a substantially square configuration with sides of length 2 l and said light-sensitive surface areas of said first, second, and third light responsive elements each having a substantially square configuration of length l, the source of optical radiation having a position with respect to the system defined by a solar zenith angle, $\theta$, and an azimuthal angle, $\phi$, in a plane of said light-sensitive surface areas, in accordance with the relationship, $$\phi = \arctan \frac{1 - R_1}{1 - R_2},$$

and $$\theta = \arctan \frac{1 - R_1}{(h/l)\sin\phi},$$

or $$\theta = \arctan \frac{1 - R_2}{(h/l)\cos\phi}.$$

where $R_1$ and $R_2$ correspond to ratios of illuminated areas of said light-sensitive surface areas.

11. The system of claim 10 wherein said mask means is provided with a transparent portion and an opaque portion, said transparent portion being arranged substantially in registration with said predetermined light-sensitive surface areas of said light-responsive elements.

12. The system of claim 11 wherein said transparent portion of said mask means is dimensioned to correspond substantially with said predetermined light-sensitive surface areas of said light-responsive elements.

13. A heating/cooling system control element for a vehicle for producing a control signal responsive to the direction of incidence of sunlight, the heating/cooling system control element comprising:
   first and second photodetector means each having an input for receiving the sunlight and an output terminal for providing an output electrical signal responsive to the sunlight, said inputs having a generally planar configuration and arranged to be substantially coplanar and adjacent to each other; and
   light mask means for controlling the incidence of the sunlight upon said input of said first photodetector means in response to the direction of incidence of the sunlight, said light mask means being provided with a portion for modulating the sunlight, said portion corresponding substantially in dimension and in configuration at least to a dimension and to a configuration of said first and second photodetector means.

14. The heating/cooling system control element of claim 13 wherein said light mask means comprises sunlight blocking means for preventing the incidence of the sunlight upon said input of said first photodetector means except over a predetermined range of angles of incidence.

15. The heating/cooling system control element of claim 14 wherein said predetermined range of angles of incidence of the sunlight include a predetermined range of angles of elevation defined by said light mask means.

16. The heating/cooling system control element of claim 14 wherein said predetermined range of angles of incidence of the sunlight include a predetermined range of angles of azimuth defined by said light mask means.

* * * * *